US010011889B2

(12) United States Patent
Liddell et al.

(10) Patent No.: US 10,011,889 B2
(45) Date of Patent: Jul. 3, 2018

(54) TREATMENT PROCESS FOR RECOVERY AND SEPARATION OF ELEMENTS FROM LIQUORS

(71) Applicant: LIFEZONE LIMITED, Ebene (MA)

(72) Inventors: Keith Stuart Liddell, Surrey (GB); Lisa Anne Smith, Mosman Park (AU); Michael David Adams, Phuket (TH)

(73) Assignee: LIFEZONE LIMITED, Ebene (MU)

( * ) Notice: Subject to any disclaimer, the term of this patent is extended or adjusted under 35 U.S.C. 154(b) by 363 days.

(21) Appl. No.: 14/950,153

(22) Filed: Nov. 24, 2015

(65) Prior Publication Data

US 2016/0145715 A1    May 26, 2016

(30) Foreign Application Priority Data

Nov. 26, 2014 (ZA) .................................. 2014/08684

(51) Int. Cl.
| | |
|---|---|
| *C22B 3/00* | (2006.01) |
| *C22B 3/20* | (2006.01) |
| *C01B 7/07* | (2006.01) |
| *C01B 17/027* | (2006.01) |
| *C01B 33/12* | (2006.01) |
| *C22B 3/08* | (2006.01) |
| *C22B 3/10* | (2006.01) |
| *C22B 26/20* | (2006.01) |
| *C22B 59/00* | (2006.01) |

(Continued)

(52) U.S. Cl.
CPC ............. *C22B 3/20* (2013.01); *C01B 7/0737* (2013.01); *C01B 17/027* (2013.01); *C01B 33/12* (2013.01); *C22B 3/04* (2013.01); *C22B 3/08* (2013.01); *C22B 3/10* (2013.01); *C22B 3/44* (2013.01); *C22B 11/04* (2013.01); *C22B 26/20* (2013.01); *C22B 59/00* (2013.01); *Y02P 10/234* (2015.11)

(58) Field of Classification Search
CPC .... C22B 3/44; C22B 3/04; C22B 3/20; C22B 3/08; C22B 3/10; C22B 11/04; C22B 59/00; C22B 26/20; C01B 7/0737; C01B 33/12; C01B 17/027; Y02P 10/234
USPC ............... 423/21.1, 22, 27, 335, 488, 578.1; 75/416, 421–423, 426–428, 711, 717, 75/720, 743, 744
See application file for complete search history.

(56) References Cited

U.S. PATENT DOCUMENTS 3,920,789 A * 11/1975 Pittie ....................... C22B 11/00
                                                  423/27
3,979,207 A *  9/1976 MacGregor .......... C01G 55/001
                                                  423/22

(Continued)

FOREIGN PATENT DOCUMENTS

| AU | 2013263848 A1 | 6/2015 |
|---|---|---|
| WO | 9960178 A1 | 11/1999 |
| WO | 2014009928 A1 | 1/2014 |

*Primary Examiner* — Steven J Bos
(74) *Attorney, Agent, or Firm* — Browdy and Neimark, PLLC (57) ABSTRACT

This invention provides a hydrometallurgical process for extracting one or more saleable products from a sulphate or chloride pregnant leach solution (PLS), or both. The products may be any one or more of the products selected from the group consisting of: precious metals including platinum group metals (PGMs), gold and silver, base metals, and rare metal elements, and metal cathodes, powders, salts or precipitates thereof; sulphur; hydrochloric acid (HCl); calcium; and silica.

14 Claims, 2 Drawing Sheets

(51) Int. Cl.
    *C22B 3/04*    (2006.01)
    *C22B 3/44*    (2006.01)

(56) References Cited

U.S. PATENT DOCUMENTS

| | | | | |
|---|---|---|---|---|
| 4,331,634 A | * | 5/1982 | Shanton | C01G 55/001 423/22 |
| 5,292,490 A | * | 3/1994 | Duyvesteyn | C01G 55/005 423/22 |
| 6,579,504 B1 | * | 6/2003 | Liddell | C22B 11/04 423/22 |
| 2008/0286180 A1 | * | 11/2008 | Jones | C22B 1/00 423/30 |

* cited by examiner

TREATMENT PROCESS FOR RECOVERY AND SEPARATION OF ELEMENTS FROM LIQUORS

BACKGROUND OF THE INVENTION

This invention relates to a hydrometallurgical process for the recovery and separation of valuable products from a sulfate or chloride pregnant leach solution, or both.

Polymetallic orebodies containing multiple valuable metals at lower grades are becoming increasingly attractive for resource companies to assess their potential for exploitation, despite the greater metallurgical challenge in the recovery and separation of such elements into saleable concentrates or products. This is generally the case for ores containing precious metals (PMs) such as platinum group metals (PGMs), gold or silver and other valuable metals such as nickel, cobalt, copper, rare earth elements (REE) including yttrium and scandium, as well as uranium, thorium, manganese, zinc, cadmium, molybdenum, vanadium, titanium and other minor elements such as vanadium, germanium and gallium.

Figure 1:
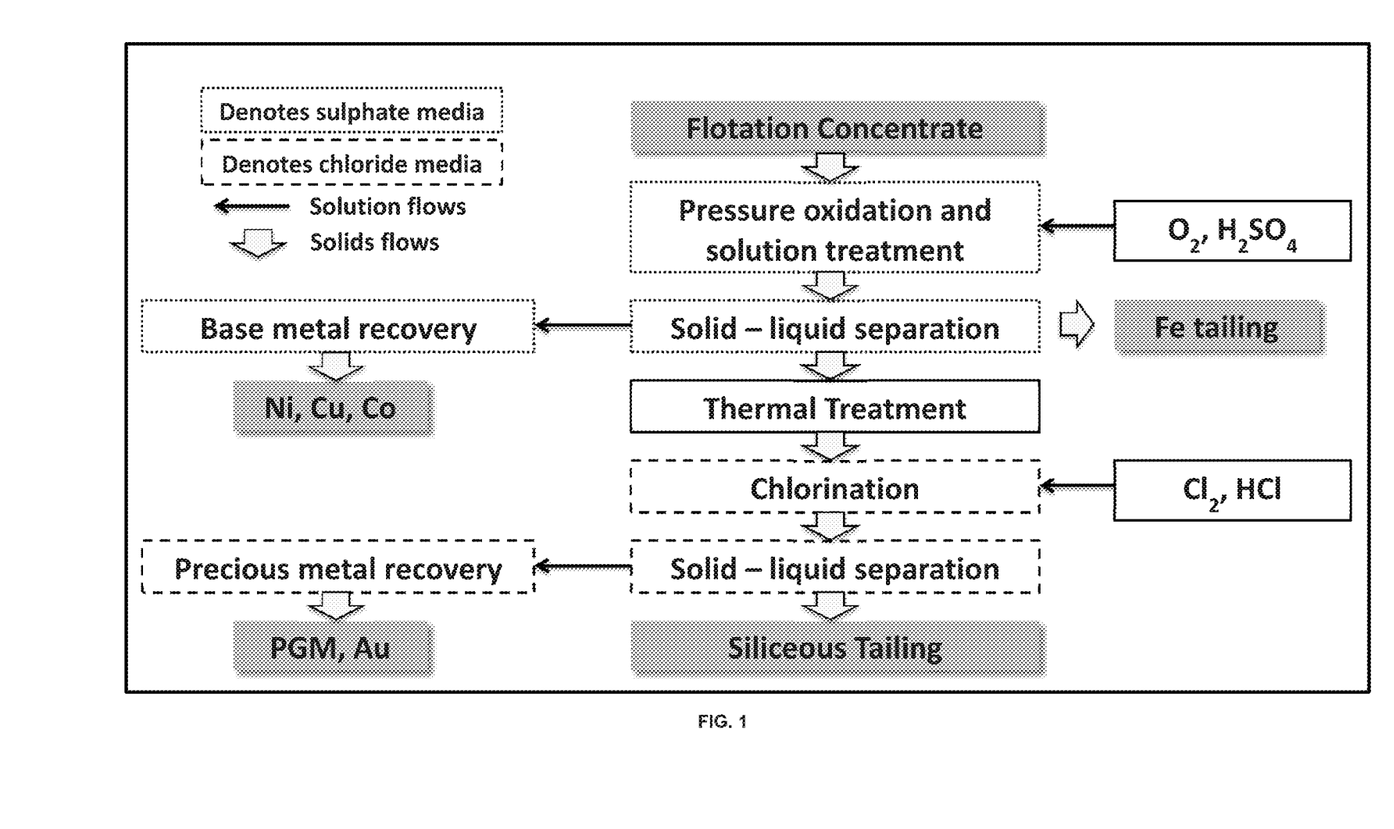
FIG. 1 is a simplified block flowsheet diagram of the core Kell Process.

Current hydrometallurgical process routes for extraction of valuable metals from polymetallic orebodies are described in International Patent Publication No. WO 99/60178, known as the "Kell Process" (see FIG. 1), International Patent Application No. WO2014/009928, and Australian Patent Application No. 2013263848 (the contents of each of which are incorporated herein by reference). All of these processes require as the starting material an ore or a concentrate of the ore and produce one or more leach liquors containing dissolved valuable metals and other elements.

The core of the Kell Process route (or "core Kell process") comprises the steps of:
  (i) leaching an ore or concentrate made from an ore in a pressure oxidation sulfate leach to dissolve base metal sulfides contained in the ore or concentrate and forming a sulfate leach filtrate containing base metals and a residue containing precious metals (PMs);
  (ii) separating the sulfate leach filtrate from the residue;
  (iii) roasting or heat treating the residue to form a calcine; and
  (iv) leaching the calcine in a chloride leach to dissolve the PMs into solution forming a chloride leach filtrate for PM recovery and a solid waste residue.

Selection of the process route for recovery and separation of valuable elements from both sulfate and chloride pregnant leach solution (PLS) for any specific application is driven largely by project-specific criteria such as end-product requirements, as well as ore and concentrate assay suite and mineralogy. Production of market-driven end-products, such as separate PMs, oxides, salts or other products, as well as mixed high-grade concentrates with particular impurity profiles may be required, for example.

The PGMs, gold, silver and other value elements are in some cases recovered from the chloride PLS by adsorbing these elements onto ion-exchange (IX) resins or other sorbent media and subsequently recovering the elements by elution, for example using a thiourea solution. PMs can be precipitated from the eluate using a caustic, ammoniacal or reductant solution to form one or more high-grade PM concentrate products for direct sale or refining, as described in International Patent Publication No. WO 99/60178. Alternatively, the loaded resin or sorbent can be incinerated directly to produce a high-grade PM concentrate product for refining, or may be shipped directly to the refinery.

However, in other cases, production of end products with certain targeted specifications may be required, whereby such specifications are best achieved via alternative methods.

Thus, the direct IX route described above is not always optimal for all feed and product types, such as for cases where the PLS contains elements or species at levels that may interfere with the IX adsorption process. An alternative process for the recovery and separation of PMs and other valuable elements from PLS that meets the criteria for other feed and product types is therefore needed.

Moreover, additional valuable elements are contained in the leach process streams described in steps (i) and (iv) above, and these valuable elements may equally warrant recovery and/or recycling and/or separation into added-value products.

An alternative process for the recovery and/or recycling and/or separation of PMs and other valuable elements from PLS to produce saleable high-grade value metals and/or metal cathodes, powders, salts or precipitate products thereof would therefore be very useful.

SUMMARY OF THE INVENTION

According to a first aspect of the invention, there is provided a hydrometallurgical process for extracting one or more saleable products selected from the group consisting of: precious metals (PMs) including platinum group metals (PGMs), gold and silver, base metals, and rare metal elements, and metal cathodes, powders, salts or precipitates thereof; sulfur; hydrochloric acid (HCl); calcium; and silica from a chloride or sulfate pregnant leach solution (PLS), or both, the process comprising:
  (i) providing to a reaction vessel the chloride or sulfate PLS;
  (ii) optionally subjecting the chloride or sulfate PLS to a sorption step resulting in a solid residue whereby saleable PMs are adsorbed to a resin or sorbent and base metals are discharged in a solution;
  (iii) subjecting the chloride PLS of (i) and where relevant, the chloride discharge solution from (ii) to a reduction and sulfide precipitation step by addition of a solution containing one or a combination of salts or acids of sulfide, hydrogen sulfide, thiosulfate, metabisuphite or sulfite or a gas including sulfur dioxide or hydrogen sulfide, to produce a product slurry comprising a solid residue containing elemental sulfur, metal sulfides and/or alloys and a discharge solution;
  (iv) solid-liquid separation of the solid residue from step (iii) above from the discharge solution, for example by filtration or by means of another suitable solid-liquid separation device, at temperatures of between about 10 and 130° C.;
  (v) subjecting the solid residue from step (iv) to a series of purification and recovery steps comprising:
    a) a sulfur removal step comprising sublimation of the solid residue at temperatures of between about 200 and 500° C. (typically in a kiln or other suitable heat treatment device), or between about 800 and 1500° C., with or without an addition of flux or other additives, to produce a solid residue or residues and a sublimed, adsorbed or scrubbed sulfur product;
    b) optionally subjecting the solid residue from step a) above to a sulfur removal step comprising dissolution of the solid residue (for example, in a stirred vessel or other suitable contactor) in a suitable solvent for sulfur, including but not limited to:

aromatic hydrocarbons (e.g. xylene and/or its isomers or mixtures (such as xylol), toluene, ethylbenzene, etc.); chlorinated or sulphidised hydrocarbons (e.g. carbon tetrachloride, chloroform, carbon disulfide, etc.); or sulfur-containing ligands (e.g. sulfite, sulfide, etc.), at temperatures of between about 10 and 130° C., to yield a solid residue and a sulfur distillate, adsorbed or scrubbed product product;

c) subjecting the solid residue from step a) and optionally b) above to a pressure oxidation leach at temperatures of between about 110 and 230° C.;

d) subjecting either a solid residue or slurry or both from step c) above to an atmospheric sulfuric acid leach at temperatures of between about 10 and 110° C. to yield a slurry comprising a solid residue including saleable PMs and a sulfate leachate solution;

e) solid-liquid separation of the solid residue comprising saleable PMs from step d) above from the slurry to yield a sulfate leachate solution, for example by filtration or by means of another suitable solid-liquid separation device, at temperatures of between about 10 and 130° C.;

f) optionally subjecting the sulfate leachate solution from e) above to a sorption step whereby saleable PMs are adsorbed to one or more resins or sorbents and base metals are discharged in a solution;

g) optionally subjecting the solid residue from step e) above to a chloride releaching step in a chloride leaching medium to produce soluble saleable metals in a purified chloride pregnant leach solution (PLS);

h) subjecting the sulfate leachate solution from e) and optionally the discharge solution from 0 to ageing, evaporation, precipitation and/or recycling into a Kell Process primary base metals recovery circuit as claimed in any of WO99/60178, WO2014/009928, or Australian Patent Application No. 2013263848; and i) optionally subjecting the discharge solution from step (iv) to a sorption step whereby saleable PMs are adsorbed to one or more resins or sorbents and base metals are discharged in a solution, or to a further sulfide precipitation step to produce a second product slurry, followed by solid-liquid separation of a secondary solid residue from the second product slurry for further purification by a method such as that outlined in (v) above, or direct sale to a third party.

The process further comprises subjecting the discharge solution from step (iv) or step (vi) to a hydrochloric acid, calcium and residual metal recovery and separation step comprising:

a) optionally feeding the discharge solution into a preboil evaporator together with seed gypsum and sulfuric acid, thereby to generate a hydrochloric acid gas and gypsum precipitate, followed by solid-liquid separation to yield precipitated gypsum for recovery and a treated discharge solution;

b) feeding the discharge solution from step (iv) or step (vi) or optionally from step a) above to a sulfuric acid rectification column or reboiler together with sulfuric acid thereby to generate a hydrochloric acid gas and a sulfuric acid solution comprising saleable and/or recoverable base and/or rare metals;

c) alternatively, feeding the discharge solution from step (iv) or step (vi) or optionally from step a) above to a pyrohydrolysis reactor to yield a slurry comprising a solid iron oxide residue for recovery and a base and/or rare metals solution, followed by solid-liquid separation;

d) subjecting the sulfuric acid solution generated in step b) above or the base and/or rare metals metal solution from step c) above to a cooling and aging step, whereby the metal sulfate salts crystallise or are subjected to a sorption step and are recovered, for example by evaporation or precipitation and/or are recycled back into a Kell Process primary base metals recovery circuit as claimed in any of WO99/60178, WO2014/009928, or Australian Patent Application No. 2013263848;

e) subjecting the hydrochloric acid gas of optionally step a) or of step b) above to distillation and absorption, thereby to recover a hydrochloric acid solution.

The recovered hydrochloric acid solution may be recycled back into a chloride leach step or a chlorination step of a Kell Process primary precious metals recovery circuit as claimed in WO99/60178, WO2014/009928, or Australian Patent Application No. 2013263848.

For example, the sulfuric acid comprising saleable or recoverable base and/or rare metals of step b) above may comprise metal sulfate salts, such as copper, nickel, cobalt, rhodium, ruthenium, iridium, vanadium, germanium, gallium or scandium.

The process may optionally further comprise an initial step of subjecting the chloride PLS to an ageing step for crystallisation of silica, comprising:

(i) feeding the chloride PLS into a holding vessel;
(ii) adding seed silica solids to the chloride PLS;
(iii) allowing the chloride PLS to stand at ambient temperature to precipitate out a solid residue comprising silica;
(iv) separating the precipitated solid residue comprising silica from the solution of (iii) to produce a silica-depleted solution; and
(v) feeding the silica-depleted solution of (iv) into step (i) of the process.

The chloride PLS may further or alternatively be concentrated to produce a concentrated PLS prior to step (i) of the process by any one or more of:

a) evaporation with condensation recovery of HCl; and/or
b) reverse osmosis (RO), nanofiltration (NF), filtration or another membrane-based separation method.

The sorption step of the process may comprise any one or more of the following steps:

a) contacting the solution with an ion exchange (IX) resin or other suitable sorbent whereby saleable metals, including PMs are adsorbed to the resin or sorbent and base metals are discharged in a solution; and/or
b) eluting the adsorbed saleable metals, including PMs from the IX resin or sorbent and precipitating the PMs from the eluate using a caustic, ammoniacal or reductant solution to form a high-grade PM concentrate or individual precious metal products; and/or
c) directly incinerating the loaded resin or sorbent to produce a high-grade PM concentrate or individual PM products; and/or
d) optionally, further processing of the saleable metals produced by any of steps (a) to (c) above.

The elution step (b) may be performed using a solution comprising acidic thiourea, salts of sulfite or hydrosulfite or chloride, or other eluants known to those skilled in the art.

Further to the process claimed in WO2014/009928, excess soluble iron in the PLS may be removed by solvent extraction, allowing recovery of acid and precipitation of a potentially saleable or storable iron product. Gold may be co-extracted by solvent systems known to those versed in the art, for separate recovery by elution and/or reduction precipitation.

DETAILED DESCRIPTION OF THE INVENTION

Figure 2:
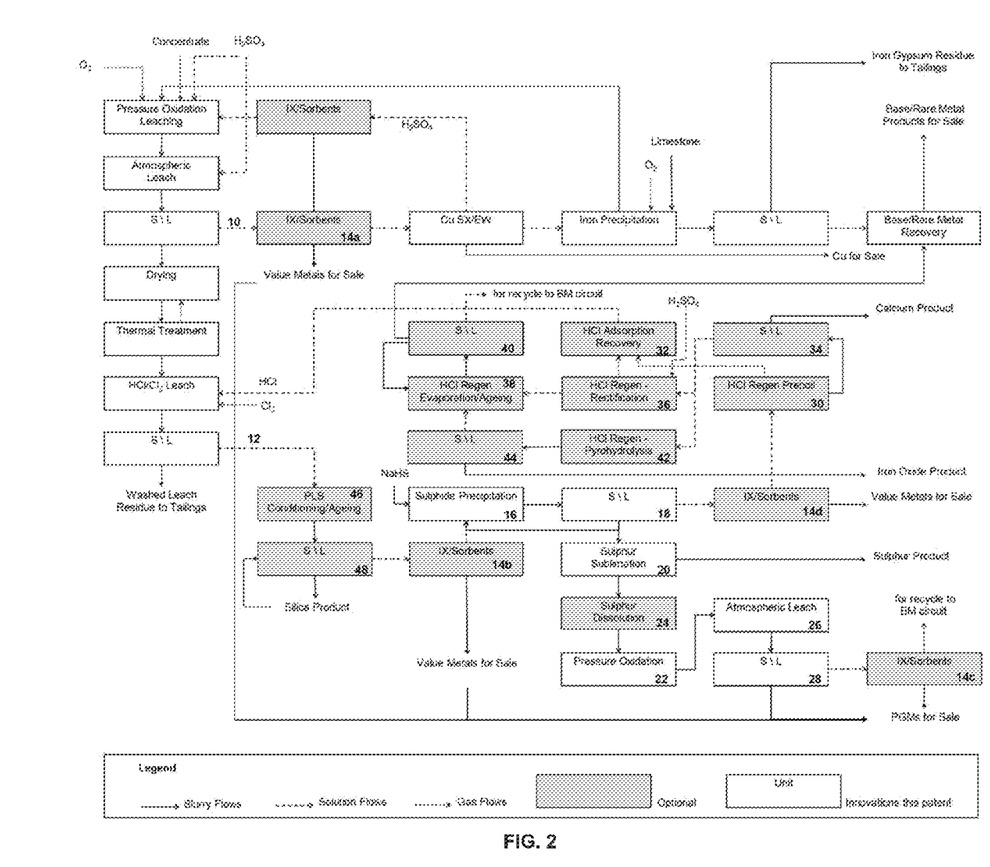
FIG. 2 is a simplified block flowsheet diagram showing the modified Kell process of the present invention.

According to a first aspect of the invention, there is provided a hydrometallurgical process for extracting one or more saleable products from a sulfate (10) or chloride (12) pregnant leach solution (PLS), or both. The products may be any one or more of the products selected from the group consisting of: PMs including platinum group metals (PGMs), gold and silver, base metals, and rare metal elements, and metal cathodes, powders, salts or precipitates thereof; sulfur; hydrochloric acid (HCl); calcium; and silica.

The terms "element", "mineral" and "metal" are used interchangeably in this specification.

As used herein, "precious metals" includes the PGMs as well as gold and silver. "PGMs" mean ruthenium (Ru), rhodium (Rh), palladium (Pd), osmium (Os), iridium (Ir), and platinum (Pt).

As used herein, "base metals" means industrial non-ferrous metals excluding the precious metals, such as aluminum, copper, cobalt, lead, nickel, tin, tungsten, zinc, cadmium and manganese. "Rare earth elements" means a group of chemically similar metallic elements comprising the lanthanide series (fifteen elements), scandium and yttrium. "Rare metals" means a group of metals including the rare earths, germanium, gallium, indium, scandium and other nominal valuable metals that may be worth recovering, including uranium, thorium, molybdenum and vanadium.

The term "saleable elements" or "saleable metals" means any element or metal that is able to generate a revenue through sale of the element or metal in metallic form or as a salt or precipitate of the metal or element.

Hydrometallurgical pregnant leach and associated solutions and intermediate solid products contain a range of value elements, including precious, base and rare elements, acids, including hydrochloric acid, and other elements such as sulfur, calcium and silica. Effective recovery of all of the above into saleable products, waste residues, or recycle streams and intermediate products for re-processing is beneficial, but seldom achieved efficiently.

The sulfate leach process stream described in step (i) of the basic Kell Process as set out in WO99/60178, may be treated by partial neutralisation and precipitation and recovery of a mixed base metal sulfide concentrate for sale. However, in some cases it may be warranted to first separately recover metals such as copper, nickel, cobalt, rhodium, ruthenium, iridium, vanadium, germanium, gallium or scandium by some sort of sorption step such as solvent extraction (SX), ion exchange (IX) and/or electrowinning (EW), precipitation or hydrogen reduction (HR) to produce a saleable high-grade metal cathode or powder, salt or precipitate product.

Furthermore, or alternatively, the chloride leach process stream described in step (iv) of the core Kell Process is typically treated for recovery of PMs conventionally by means of IX or other sorbent or by the innovation described in WO99/60178. However, in some cases it may also be warranted to separately recover residual metals in the barren chloride stream, such as copper, nickel, cobalt, rhodium, ruthenium, iridium, vanadium, germanium, gallium or scandium by conventional methods such as SX, IX and/or EW, precipitation or HR to produce a saleable high-grade metal cathode or powder, salt or precipitate product.

As illustrated in FIG. 2 in general, the context of the invention is a hydrometallurgical process for extracting saleable products including valuable metals from sulfur (10) or chloride (12) PLS process streams or both within a core "Kell Process" as described in International Patent Publication No. WO 99/60178, (see FIG. 1), or a modified Kell Process as described in International Patent Application No. PCT/IB2013/055760 (WO2014/009928), and Australian Patent Application No. 2013263848 (the contents of each of which are incorporated herein by reference). In particular, waste and intermediate streams are treated by various multi-step processes, thereby to yield saleable elements and products.

As is provided in more detail in the steps below, an important aspect of the invention which enables higher recovery of base metals and precious metals is the ability to recycle any sulfate stream that is produced within the chloride leaching circuit, including metal sulfate sludge from the HCl recovery circuit, and the PM sulfide pressure oxidation/atmospheric leach solution back into the sulfate leaching circuit for base metal recovery, provided that chloride has been removed from the solution. The solutions may be recycled back into the pressure oxidation feed or atmospheric leach feed, depending on the water and acid balance of the particular application. The enhanced recovery is achieved by a) the secondary leaching of base metals in the chloride leaching circuit and b) in the way that the HCl is regenerated by distillation from sulfuric acid.

One particular embodiment described in this invention comprises a first optional step if desired or necessary, where a chloride (12) PLS is concentrated such as by:

a) evaporation with condensation recovery of HCl; and/or b) reverse osmosis (RO), nanofiltration (NF), filtration or another membrane-based separation method.

In another particular embodiment of this invention, the sulfur (10) or chloride (12) PLS, or concentrate thereof, may optionally be subjected to a sorption (14a and 14b) step including the use of any one or more of IX, chelating (e.g. thiol, thiouronium, polyamine or other) sorbent resins, fibres, carbons, biological materials or other materials known to those skilled in the art, capable of recovering small amounts of minor fugitive precious or other value metals from chloride PLS, sulfide precipitation barren, precious metal intermediate product upgrade liquor or base metal PLS.

The optional sorption step typically comprises any one or more of the following steps:

a) contacting the solution with an IX resin or other suitable sorbent known to those skilled in the art such as silica or polymeric adsorbent beads, fibres, carbons, or biological materials such as chitosan or other plant or vertebrate/invertebrate-derived products, whereby saleable metals, including PMs are adsorbed to the resin or sorbent and base metals are discharged in a solution;

b) eluting the adsorbed saleable metals, including PMs from the IX resin or sorbent and precipitating the PMs from the eluate using a caustic, halogenic, sulphitic, ammoniacal or other suitable eluant solution to form a high-grade PM concentrate or individual PM products; and/or c) directly incinerating or smelting the loaded resin or sorbent to produce a high-grade PM concentrate or individual PM products.

If desired or where necessary, the saleable metals produced by any of steps (a) to (c) above may be further processed prior to sale.

The elution step (b) may be performed using a solution comprising acidic thiourea, salts of sulfite or hydrosulfite or chloride, or other eluants known to those skilled in the art.

In a preferred embodiment of the invention, either with or without one or more of the optional steps set out above, the chloride PLS (12) or concentrate thereof is subjected to a sulfide precipitation step (16), enabling recovery of intermediate sulfide products of valuable metals, such as platinum, palladium, gold, rhodium, ruthenium, iridium, copper, nickel, cobalt. The chloride PLS (12) or concentrate thereof is typically subjected to addition of sulfide, in the form of, for example, sodium hydrosulfide or sodium hydrogen sulfide (NaHS) or any alkali metal or alkaline earth or other metal salt or solution thereof. In one embodiment of the invention, hydrogen sulfide gas in undiluted or diluted form, under pressure or atmospheric conditions, is used as the source of sulfide.

The chloride PLS may comprise other elements such as iron, aluminium and other gangue elements and may be modified if necessary, and maintained to provide a suitable environment conducive to the co-precipitation of metals, sulfides, sulfur and associated species, producing an intermediate sulfurous product. For example, to achieve this, typically oxidation-reduction potential (ORP) is in the range 200-900 mV (vs Ag/AgCl), iron and aluminium levels of 2-30 g/L and free acidity is 5-250 g/L. The intermediate sulfide product/s are recovered by solid-liquid separation using filtration, thickening or other means known to those skilled in the art.

After sulfide precipitation, the resultant slurry is subjected to a solid-liquid separation step (18), for example by filtration or by means of another suitable solid-liquid separation device, at temperatures of between about 10 and 130° C. to separate an intermediate sulfide product from a barren chloride solution.

The intermediate sulfide product from the sulfide precipitation step is then subjected to a calcination (sublimation) step (20) for removal of sulfur under reducing, neutral or oxidising conditions, or a combination thereof, at temperatures of between about 100 and 700° C., more preferably between about 200 and 500° C. or alternatively, between about 800 and 1500° C., with or without addition of flux or other additives. Sulfur is released as a sublimate and is typically collected in a cold trap, chiller, condenser or other applicable item of equipment known to those skilled in the art. This sulfur may be blended with sulfur used in the production of sulfide salts or gases and recycled for use as a precipitating agent in the sulfide precipitation process (16). This production route may comprise, for example, high-temperature kiln reduction using gases of hydrogen, steam and/or carbon monoxide (as already produced in the Kell Process, readily available and an integral part thereof). By removal of sulfur in the sublimation step (20) an intermediate product upgraded in PMs is produced which is typically further processed by a pressure oxidation leach treatment (22). The sulfur is alternatively converted under oxidising conditions to sulfur dioxide, which may be recovered in a suitable scrubber and converted into usable sulfuric acid; or under reducing conditions to hydrogen sulfide, for recovery.

In an optional alternative or additional embodiment of the invention, the intermediate sulfide product of the sulfide precipitation step (16), or the intermediate product upgraded in PMs of the sublimation step (20) may be optionally subjected to a sulfur removal step comprising dissolution of the solid residue (24) (for example, in a stirred vessel or other suitable contactor) in a suitable solvent for sulfur, including but not limited to: aromatic hydrocarbons (e.g. xylene and/or its isomers or mixtures (such as xylol), toluene, ethylbenzene, etc.); chlorinated or sulphidised hydrocarbons (e.g. carbon tetrachloride, chloroform, carbon disulfide, etc.); or sulfur-containing ligands (e.g. sulfite, sulfide, etc.), at temperatures of between about 10 and 130° C., to a solid residue and a sulfur distillate product. The solid residue may then be fed into the next step of the process, vis. the pressure oxidation leach step (22).

The sulfur-depleted products from either step (20) or (24) are typically then subjected to a pressure oxidation leach treatment (22), at temperatures from between about 120 to 230° C., typically at 200° C. for 90 min with 100-400 kg/t sulfuric acid addition, to further remove sulfur and acid-soluble base and gangue metals into a sulfuric acid medium, including Cu, Ni, Co, Fe, Al, Mg and others, such as Sc and V. The sulfuric acid medium is then typically fed into a sulfuric acid leach treatment under atmospheric conditions (26).

The atmospheric sulfuric acid leach treatment (26) is generally performed using 50-400 g/L $H_2SO_4$ for up to 36 hours, to further remove sulfur and acid-soluble base and gangue metals into a sulfuric acid medium, including Cu, Ni, Co, Fe, Al, Mg and others, such as Sc and V. The product slurry of the sulfuric acid leach treatment is then typically subjected to solid-liquid separation (28) as described above to separate the sulfuric acid leachate comprising base metals from an intermediate solid residue upgraded in PMs.

These base metals are readily recovered by recycling the sulfuric acid leachate to the base metal recovery circuit on the core Kell Process, as claimed in any of WO99/60178, WO2014/009928, or Australian Patent Application No. 2013263848. If desired, the sulfuric acid leachate may be further treated in an optional sorption step (14c) as described above, for sorption of any residual PMs remaining in the medium, where the discharge solution comprises the base metals for recycling into the core Kell Process. The adsorbed PMs may then be eluted as described in the sorption step set out above and recovered. Alternatively, or in addition, the base metals in the sulfuric acid leachate may be subjected to various purification methods known to those skilled in the art, including evaporation, precipitation, or before recycling back into the basic Kell Process primary base metals recovery circuit.

By removal of additional sulfur and the base metal elements in the pressure oxidation (22) and atmospheric leach (26) steps, followed by solid-liquid separation (28), an intermediate product further upgraded in PMs is produced. This may optionally be further processed, such as for example by chloride leaching in a chloride leach medium.

Optionally, the residue from the pressure oxidation (22) and/or atmospheric leach (26) steps can be subjected to solid-liquid separation and washing using filtration, thickening, centrifuging or other means known to those skilled in the art, followed by drying. By removal of water and any other volatiles an intermediate product further upgraded in PMs is produced. This product is typically readily saleable to PGM and/or gold refineries.

In a further embodiment of the invention, the barren chloride solution from the sulfide precipitation step (16), is subjected to a preboil-rectify-reboil treatment, enabling recovery of strong hydrochloric acid, removal of calcium and recovery of residual metal sulfate salts, such as copper, nickel, cobalt, rhodium, ruthenium, iridium, vanadium, germanium, gallium or scandium, for recycle or recovery.

The barren chloride solution may optionally first be subjected to a sorption step (14d) as described above to yield a residue comprising value metals for sale and a discharge solution. The discharge solution is then subjected to the preboil-rectify-reboil treatment.

More specifically, in this preboil-rectify-reboil method, the barren chloride solution (after recovery of both primary and scavenged PMs and other fugitive elements) is subjected to acid and metals recovery by exploiting differences in solubility of metal sulfates under the selected conditions. The barren chloride solution is first contacted with 70% sulfuric acid and is preheated in a pre-boil stage (30) in which the bulk of the hydrochloric acid is boiled off as a gas for absorption and recovery (32). Calcium is removed by the precipitation of gypsum in this stage, with subsequent solid-liquid separation (34) by thickening and filtration, generating waste solids for disposal. Part of the thickener underflow may be recycled to the contactor as seed material.

The low-calcium discharge solution from the preboil stage (30) is then introduced part way down a distillation column while additional 60-80% sulfuric acid is introduced to the top of the column at a rate dictated by the required recovered hydrochloric acid strength in a sulfuric acid rectification step (36). A reboiler heated with steam or other means is used to heat the liquor at the bottom of the column to ~110-160° C., while the column tops are at ~95-125° C. Water remains largely unvolatilised, while the remaining hydrochloric acid is almost completely volatilised and may be recovered by adsorption (32).

Vapours from the column and pre-boiler pass through a water-cooled absorber column in an absorption step (32) where the hydrochloric acid is recovered by absorption into chlorination filter wash water, producing approximately 25-40% hydrochloric acid suitable for use in the primary chlorination leach if desired, while directly reusing wash water.

Diluted sulfuric acid (~35-65%) discharges from the bottom of the rectification column in the rectification step (36) and is passed into an evaporator to recover absorbed water for reuse, producing a ~60-80% sulfuric acid that is subjected to a cooling and aging step (38), which is performed in storage tanks, where supersaturated metal sulfates crystallise and may be harvested by solid liquid separation (40). The contained sulfuric acid and metals may also be recovered or reused by recycling them to the base metals recovery circuit of the core Kell Process as claimed in any of WO99/60178, WO2014/009928, or Australian Patent Application No. 2013263848, into the pre-leach, pressure oxidation and/or atmospheric acid leach steps. The acid content is used in the primary base metal leach circuit, while the metal sulfates dissolve in that step and are recovered in the base metal circuit of the Kell Process or separately, thereby increasing the overall base metal recovery of the process to high values.

The vapours from the evaporator of the cooling and aging step (38) pass into a water-cooled condenser where they are condensed into a liquor suitable for use as second-stage chlorination filter wash water. The concentrated (~60-80%) sulfuric acid that is recovered is recycled to a sulfuric acid makeup tank where 98% sulfuric acid is added to make up the sulfate that is removed to filter cake and recycled to the base metal circuit of the process. The made-up sulfuric acid is then available for reuse in the pre-boil and preheater sections of the circuit.

As an alternative optional embodiment of the invention, rather than subjecting the low-calcium discharge solution from the preboil step (30) to sulfuric acid rectification (36), the low-calcium discharge solution may be fed into a pyrohydrolysis reactor (42) to yield a slurry comprising a solid iron oxide residue and a base and/or rare metals solution. The solid iron oxide residue may then be recovered by solid-liquid separation (44) and the pyrohydrolysis discharge solution may be fed into the cooling and aging step (38).

In a further optional embodiment of the invention, silica is removed from the chloride PLS (12) prior to sulfide precipitation (16) or sorption by a conditioning and aging step (46), allowing the silica to crystallise into a filterable form suitable for removal by solid-liquid separation (48). Typically, this step is performed by:
    (i) feeding the chloride PLS into a holding vessel;
    (ii) adding seed silica solids to the chloride PLS;
    (iii) allowing the chloride PLS to stand at ambient temperature to precipitate out a solid residue comprising silica;
    (iv) separating the precipitated solid residue comprising silica from the solution of (iii) to produce a silica-depleted solution; and
    (v) feeding the silica-depleted solution of (iv) into step (i) of the process.

The chloride and/or sulfate acids from the process of the invention may optionally be recycled and additional amounts of metals may be recovered during this recycling process. For example, base metals such as nickel, copper and cobalt may be recovered as sulfates in wash waters from final residues and can be recycled along with sulfuric acid to sulfate streams earlier in the process. For example, recovered sulfate acid solutions may be recycled back into sulfate streams of a Kell Process primary base metals recovery circuit as claimed in WO99/60178, WO2014/009928, or Australian Patent Application No. 2013263848.

Any minor fugitive precious or other value metals can likewise be recovered as chlorides in wash waters from final residues and can be recycled along with hydrochloric acid to chloride streams earlier in the process or recovered directly. For example, recovered hydrochloric acid solution may be recycled back into a chloride leach step or a chlorination step of a Kell Process primary precious metals recovery circuit as claimed in WO99/60178, WO2014/009928, or Australian Patent Application No. 2013263848.

In an optional embodiment of the invention, techniques described in International Patent Publication No. PCT/IB2013/05576 may also be applied, allowing recovery of sulfuric acid and precipitation of a potentially saleable or storable iron product.

EXAMPLES: RECOVERY OF PGM, AU, CA, HCL, CU, NI AND CO FROM PREGNANT LEACH SOLUTION

The following examples are provided to demonstrate the efficacy of the techniques described herein that have been brought to bear on the recovery and separation of several elements in various solution streams, resulting in potentially economic recovery and/or separation of multiple value elements and possible reuse or regeneration of reagents.

These examples, however, are not to be construed as limiting in any way either the spirit or scope of the invention.

In the following examples, a 2-stage locked-cycle test was undertaken on a pressure oxidation residue from a Kell Process pilot plant, comprising sulfuric acid conditioning (atmospheric leach), thermal treatment, chlorination leach and PM recovery by NaHS precipitation. Also included in the cycle was calcium removal, HCl and base metals recovery.

Example 1

Recovery of Hydrochloric Acid and Removal of Calcium

In this example, barren liquor from which the majority of the precious metals had been recovered was composted from large-scale test liquors and found to contain 95 g/L HCl, 209 g/L CT and 1.58 g/L Ca. The liquor was fed semi-continuously into a sealed preboiler vessel to achieve a specific residence time at elevated temperature. A 70% sulfuric acid liquor was passed into the reactor at pre-selected feed ratios. Under these conditions, hydrochloric acid is volatilised and recovered for reuse, in this case in a condenser held at 5° C. Depletion of hydrochloric acid from solution, along with contact with seed gypsum precipitate in the reactor, enables the precipitation of gypsum and efficient removal of calcium from the system. This allows further treatment in distillation column and reboiler to take place with negligible calcium scale and moreover, with greater HCl recovery efficiency by starting from a lower hydrochloric acid strength. The results are summarised in Table 1.

TABLE 1

Summary of Hydrochloric Acid and Calcium Recoveries

| Time | Cl⁻ Recovery (% gas balance) | Cl⁻ Recovery (% aqueous balance) | Ca Recovery (%) | Ratio Feed: $H_2SO_4$ (70%) |
|---|---|---|---|---|
| 0 | 0 | 0 | 0 | 0 |
| 45 | 14.4 | 10 | 38 | 0.2 |
| 90 | 40.4 | 41 | 81 | 0.3 |
| 135 | 69.2 | 70 | 88 | 0.5 |
| 180 | 93.0 | 94 | 91 | 0.6 |
| 225 | 99.2 | 99 | 84 | 0.8 |
| 270 | 99.8 | 100 | 76 | 0.9 |
| 315 | 99.9 | 100 | 69 | 1.1 |

Example 2

Recovery of PGM, Gold and Copper from Pregnant Leach Solution with Sodium Hydrosulfide In this example, precious and base metals were recovered from chlorination PLS in a single stage reactor held at 80° C. for 30 min and into which PLS was fed continuously along with a 20% NaHS solution at a pre-selected dosage rate. The PLS head assay is summarised in Table 2, while the precipitation efficiencies are summarised in Table 3. Cycle 1 is considered to represent an approach to steady state, whilst Cycle 2 reflects a result more characteristic of steady-state conditions. PGM, Au and Cu are recovered at high efficiency, and with potential shown for selective recovery of Pt and Pd in Stage 1 and metals such as Au, Ru and Cu in Stage 2, and it should be noted that residual PMs are ultimately recycled in the subsequent HCl and metals recovery stage, effectively increasing overall recoveries of value elements close to 100%. Base metals such as Ni, Co, Fe and Zn largely pass through the NaHS precipitation for recovery.

TABLE 2

PLS Head Assays

| Element | Unit | Cycle 1 Assay | Cycle 2 Assay |
|---|---|---|---|
| Pt | mg/L | 37.0 | 41.5 |
| Pd | mg/L | 8.7 | 10.2 |
| Au | mg/L | 1.2 | 0.0 |
| Fe | g/L | 7.4 | 10.2 |
| Al | g/L | 1.7 | 1.6 |
| Mg | g/L | 5.4 | 7.5 |
| Ni | mg/L | 648 | 721 |
| Cu | mg/L | 1050 | 1298 |
| Co | mg/L | 15.4 | 15.7 |
| Cr | mg/L | 100.5 | 496.4 |
| Mn | mg/L | 45.5 | 75.5 |
| Zn | mg/L | 84.6 | 22.1 |

TABLE 3

Summary of NaHS Precipitation Efficiencies from PLS

| | Precipitation Efficiency (%) | |
|---|---|---|
| Element | Cycle 1 | Cycle 2 |
| Pt | 97 | 99 |
| Pd | 88 | 82 |
| Rh | 96 | 96 |
| Au | 34 | 93 |
| Ru | 47 | 91 |
| Cu | 66 | 93 |
| Ni | 1 | 0 |
| Co | 6 | 0 |
| Fe | 16 | 0 |
| Zn | 0 | 3 |

Example 3

Recovery of HCl and Calcium from Barren Solution

In this example, the recovery of free HCl along with some bound chlorides along with removal of calcium from the system is demonstrated for Cycle 2 of the locked cycle test. About half of the chloride is recovered in this step, calcium removal is close to 100% and there is negligible loss of base metals.

TABLE 4

Recovery of HCl and Calcium from Barren Solution

| Element | Feed (g/L; mg/L) | Recovery (%) |
|---|---|---|
| HCl | 126 | 100.0 |
| Cl⁻ | 208 | 47.7 |
| Al | 2032 | 0.0 |
| Ca | 17080 | 98.2 |
| Co | 15 | 0.9 |
| Cr | 659 | 0.0 |
| Cu | 1303 | 0.0 |
| Fe | 12760 | 0.0 |
| Mg | 7043 | 0.0 |
| Mn | 80 | 0.1 |
| Ni | 590 | 0.0 |
| Zn | 590 | 0.0 |

Example 4

Recovery of HCl and Metals from Calcium-Deficient Barren Solution

In this example, the recovery of bound chlorides as HCl along with removal of base metals from the system in a precipitate sludge is demonstrated for Cycle 1 of the locked cycle test. The majority of the remaining chloride is recovered in this step, along with substantial recovery of base metals.

TABLE 5

Recovery of HCl and Metals from Calcium-Deficient Barren Solution

| Element | Feed (g/L; mg/L) | Recovery (%) |
|---|---|---|
| Cl⁻ | 1.0 | 88.5 |
| Al | 702.8 | 17.4 |
| Co | 1.4 | 83.0 |
| Cr | 160.4 | 20.9 |
| Cu | 36.7 | 60.8 |
| Fe | 999.9 | 78.7 |
| Mg | 1958.7 | 39.2 |
| Mn | 18.0 | 50.9 |
| Ni | 197.2 | 47.6 |
| Zn | 8.0 | 78.6 |

Example 5

Removal of Impurity Elements from Intermediate Sulfide Precipitate

In this example, the removal of impurity elements from intermediate sulfide precipitate was achieved in a 3-stage process. In the first stage, the precipitate was subjected to heat treatment at 450° C. for 2 hours under nitrogen, achieving removal of 92.3% of the sulfur as a fume by sublimation. This relatively pure sulfur fume can be readily recovered in a cold trap, condenser, chiller or other device known to those versed in the art, potentially producing a sulfur by-product.

In the second stage, the purified solids in this example, were subjected to pressure oxidation at 200° C. for 90 min with addition of 200 kg/t sulfuric acid, followed by a third stage of atmospheric leach at 80° C. for 1440 min in 300 g/L sulfuric acid. The results are shown in Table 6, demonstrating negligible effect on platinum and palladium, but with substantial removal of gangue and base metal elements. The leach liquor is sulfate based and is therefore readily recycled to the pressure oxidation, atmospheric leach or base metal recovery sections of the Kell process, where Cu, Ni and Co are recovered at high efficiency and iron is removed. Any fugitive Pt and Pd may be readily scavenged from the PLS using conventional or chelating ion-exchange resins or other sorbents.

TABLE 6

Removal of Impurity Elements from Intermediate Sulfide Precipitate

| Element | Precipitate Grade (%) | Removal (%) |
|---|---|---|
| Pd | 0.2 | 0.2 |
| Pt | 0.3 | 0.4 |
| Al | 0.6 | 54.1 |
| Ca | 0.8 | 79.5 |
| Co | 0.0 | 82.5 |
| Cr | 0.2 | 55.5 |
| Cu | 15.9 | 98.4 |
| Fe | 4.4 | 64.6 |
| Mg | 6.3 | 59.1 |
| Mn | 0.0 | 71.9 |
| Ni | 1.0 | 88.2 |
| S | 59.8 | 99.9 |
| Zn | 0.0 | 95.0 |

Example 6

Removal of Silica from PLS

In this example, the removal of silica and other impurity elements by precipitation from chlorination PLS is achieved by control of temperature and ageing time. The solution is cooled naturally from a process temperature of 90° C. to ambient temperature to effect precipitation of silica and other impurity elements, decreasing Si in solution from 145 mg/L in the feed to 10 mg/L in the discharge. The precipitate (refer to Table 7) is subsequently separated from the PLS by filtration.

TABLE 7

Removal of Silica and Impurity Elements from Chlorination PLS

| Element | Precip Grade (%) |
|---|---|
| Al | 0.5 |
| Ca | 14.8 |
| Co | 0.0 |
| Cr | 0.5 |
| Cu | 0.0 |
| Fe | 4.2 |
| Mg | 4.8 |
| Mn | 0.0 |
| Ni | 0.0 |
| S | 12.0 |
| Si | 10.3 |
| Zn | 0.0 |

Example 7

Recovery of Pt/Pd and Ag/Cu/as Products from Pregnant Leach Solution with Sodium Hydrosulfide In this example, Pt/Pd and Ag/Cu/As sulfides were selectively precipitated from chlorination PLS in a single stage reactor held at 60° C. for 30 then 120 min and into which PLS was fed continuously along with a 20% NaHS solution at a pre-selected dosage rate. The PLS head assay is summarised in Table 8, while the precipitation efficiencies are summarised in Table 9. This is considered to represent an approach to obtaining separate products, as indicated by the results presented in Example 2. These elements are recovered at high efficiency, and with potential further shown in Example 2 for selective recovery of metals such as Au and Ru. Base metals such as Ni, Co and Fe largely pass through the NaHS precipitation, for recovery in the subsequent HCl and metals recovery stage.

TABLE 8

PLS Head Assays

| Element | Unit | Head Assay |
|---|---|---|
| Pt | mg/L | 38.8 |
| Pd | mg/L | 10.2 |
| Au | mg/L | <2 |
| Fe | g/L | 13.3 |
| Al | g/L | 2.7 |
| Mg | g/L | 12.7 |
| Ni | mg/L | 595 |
| Cu | mg/L | 993 |
| Co | mg/L | 25 |
| Cr | mg/L | 211 |
| Mn | mg/L | 88 |
| Zn | mg/L | 46 |
| As | mg/L | 7.6 |

TABLE 9

Summary of NaHS Precipitation Efficiencies from PLS

| | Precipitation Efficiency (%) | |
|---|---|---|
| Element | 30 min | 120 min |
| Pt | 98 | 100 |
| Pd | 100 | 100 |
| Ag | 0 | 80 |
| Cu | 1 | 100 |
| As | 30 | 80 |
| Ni | 1 | 0 |
| Co | 1 | 3 |
| Fe | 2 | 0 |

REFERENCES

1. Liddell, K. S. and Adams, M. D. Kell hydrometallurgical process for extraction of platinum group metals and base metals from flotation concentrates, J. S. Afr. Inst. Min. Metall. Trans., vol. 112, January 2012, pp. 31-36.
2. Liddell, K. S., Newton, T., Adams, M. D. and Muller, B. Energy consumptions in Kell hydrometallurgical refining versus conventional pyrometallurgical smelting of PGM concentrates, J. S. Afr. Inst. Min. Metall. Trans., vol. 111, February 2011, pp. 127-132.

What is claimed:

1. A hydrometallurgical process for extracting platinum group metals (PGMs) and one or more additional saleable products selected from the group consisting of gold, silver, a base metal, a rare metal element, sulfur, hydrochloric acid (HCl), and calcium; from a chloride pregnant leach solution (PLS), containing PGMs and one or more of the additional saleable products, the process comprising the steps of:
    (i) subjecting the chloride PLS to a reduction and sulfide precipitation step by addition of
        (A) a solution comprising one or a combination of salts or acids of sulfide, hydrogen sulfide, thiosulfate, metabisulfite or sulfite, or
        (B) a gas comprising sulfur dioxide or hydrogen sulfide,
        to produce a product slurry of a solid residue comprising elemental sulfur, metal sulfides and/or alloys and a discharge solution;
    (ii) performing solid-liquid separation of the solid residue from step (i) from the discharge solution by a solid-liquid separation means, at temperatures of between about 10° C. and 130° C.; and
    (iii) subjecting the solid residue from step (ii) to a series of purification and recovery steps comprising:
        (A) a sulfur removal step comprising sublimation of the solid residue at temperatures of between about 200° C. and 500° C., to produce a solid residue and a sulfur sublimate product;
        (B) subjecting the solid residue from step (iii)(A) to a pressure oxidation leach at temperatures between about 110° C. and 230° C.;
        (C) subjecting the solid residue from step (iii)(B) to an atmospheric sulfuric acid leach at temperatures between about 10° C. and 110° C. to yield a slurry of a solid residue comprising saleable PGMs and precious metals consisting of gold, silver or both and a sulfate leachate solution;
        (D) performing a solid-liquid separation of the solid residue from step (iii)(C) from the sulfate leachate solution by a solid-liquid separation means, at temperatures between about 10° C. and 130° C.;
        (E) optionally, sorption of the sulfate leachate solution from step (iii)(D) with one or more resins or sorbents, whereby saleable precious metals (PMs) are adsorbed and base metals are discharged in a solution;
        (F) optionally, chloride releaching the solid residue from step (iii)(D) in a chloride leaching medium to produce soluble saleable metals in a purified chloride pregnant leach solution (PLS);
        (G) subjecting the discharge solution from step (ii) or the leachate solution from step (iii)(E) to HCl, calcium and residual metal recovery and separation comprising one or more steps of preboil, rectification, distillation, adsorption, reboil and pyrohydrolysis; and
        (H) recovering the PGMs and PMs consisting of gold, silver, or both, and one or more additional saleable products selected from the group consisting of base metals, rare metal elements, HCl, and calcium from the solid residue, sulfate leachate solution, chloride pregnant leach or discharge solution.

2. The hydrometallurgical process according to claim 1 wherein the HCl, calcium and residual metal recovery and separation comprises one or more of the following steps:
    (I) feeding the discharge solution into a preboil evaporator together with seed gypsum thereby generating an HCl gas and gypsum precipitate, followed by solid-liquid separation to yield precipitated gypsum for recovery and/or disposal and a treated discharge solution;
    (II) feeding the treated discharge solution from step (I) to:
        (A) a sulfuric acid rectification column and reboiler together with sulfuric acid thereby generating an HCl gas and a sulfuric acid solution comprising saleable base and/or rare metals; or
        (B) a pyrohydrolysis reactor to yield a slurry comprising a solid iron oxide residue for recovery and a base and/or rare metals solution, followed by solid-liquid separation;
    (III) subjecting the sulfuric acid solution generated in step (II)(A) or the base and/or rare metal solution from step (II)(B) to a cooling and aging step, whereby the metal sulfate salts crystallize or are subjected to a sorption step and are recovered, including by evaporation or precipitation and/or are recycled back into a base metals recovery circuit; and
    (IV) subjecting the HCl gas of step (I) or step (II) to distillation and absorption, thereby recovering an HCl solution.

3. The hydrometallurgical process according to claim 2, wherein the recovered HCl is recycled back into a chloride leach step of a precious metals recovery circuit.

4. The hydrometallurgical process according to claim 1, further comprising subjecting the chloride PLS to ageing for crystallization of silica, which ageing comprises:
(I) feeding the chloride PLS into a holding vessel;
(II) adding seed silica solids to the chloride PLS;
(III) allowing the chloride PLS to stand at ambient temperature to precipitate out a solid residue comprising silica;
(IV) separating the precipitated solid residue comprising silica from the solution of step (iii) to produce a silica-depleted solution; and
(V) feeding the silica-depleted solution of step (IV) into step (i).

5. The hydrometallurgical process according to claim 1, further comprising a step of concentrating the chloride PLS to produce a concentrated PLS prior to step (i) by any one or more of:
(A) evaporation with condensation recovery of HCl; and
(B) a membrane-based separation method comprising reverse osmosis (RO), nanofiltration (NF), or filtration.

6. The hydrometallurgical process according to claim 1, further comprising before step (i), sorption of the chloride PLS to a resin or sorbent to produce one or more solid residues, whereby precious metals are adsorbed and base metals are discharged in a solution that is subjected to step (i).

7. The hydrometallurgical process according to claim 1, further comprising subjecting the solid residue from step (iii)A to a sulfur removal step comprising dissolution of the solid residue in a solvent for sulfur, comprised of: aromatic hydrocarbons; chlorinated or sulfidized hydrocarbons; or sulfur-containing ligands, at temperatures of between about 10° C. and 130° C., to yield a second solid residue and a second sulfur sublimate, adsorbed or scrubbed product.

8. The hydrometallurgical process according to claim 7, further comprising subjecting the second solid residue to a pressure oxidation leach at temperatures of between about 110° C. and 230° C.

9. The hydrometallurgical process according to claim 1, further comprising sorption of saleable precious metals in any sulfate or discharge solution from step (ii) or (iii) to one or more resins or sorbents, whereby saleable precious metals are adsorbed and base metals are discharged in solution.

10. The hydrometallurgical process according to claim 9, wherein the base metals discharged in solution after sorption are further subjected to ageing, evaporation, precipitation and/or recycling into a base metals recovery circuit.

11. The hydrometallurgical process according to claim 1, further comprising chloride releaching of the solid residue from step (iii)(D) in a chloride leaching medium to produce soluble saleable metals in a purified chloride pregnant leach solution (PLS).

12. The hydrometallurgical process according to claim 1, further comprising sulfide precipitating the discharge solution from step (ii) to produce a second product slurry, followed by solid-liquid separation of a secondary solid residue from the second product slurry for subjecting to step (iii) purification, or for sale.

13. The hydrometallurgical process according to claim 1, wherein any one of the sorption steps comprises one or more of the following steps:
(I) contacting the solution with a sorbent or ion exchange (IX) resin whereby saleable precious metals are adsorbed to the resin or sorbent and base metals are discharged into solution;
(II) eluting the adsorbed saleable precious metals from the IX resin or sorbent to form an eluate and precipitating the precious metals from the eluate using a caustic, ammoniacal or reductant solution to form a high-grade precious metals concentrate or individual precious metals products; and
(III) directly incinerating the loaded resin or sorbent to produce a high-grade precious metals concentrate or individual precious metal products.

14. The hydrometallurgical process according to claim 13, wherein the eluting step (II) is performed using a solution that comprises acidic thiourea, a salt of a sulfite, hydrosulfite, or chloride.

* * * * *